(12) United States Patent
Roodenburg et al.

(10) Patent No.: US 7,850,397 B2
(45) Date of Patent: Dec. 14, 2010

(54) MARINE J-LAY PIPELAYING SYSTEM

(75) Inventors: Joop Roodenburg, Delft (NL); Erwin Vincent van Liere, Breda (NL)

(73) Assignee: Itrec B.V., Schiedam (NL)

( * ) Notice: Subject to any disclaimer, the term of this patent is extended or adjusted under 35 U.S.C. 154(b) by 532 days.

(21) Appl. No.: 11/660,038

(22) PCT Filed: Aug. 13, 2004

(86) PCT No.: PCT/NL2004/000572

§ 371 (c)(1),
(2), (4) Date: Apr. 30, 2008

(87) PCT Pub. No.: WO2006/016798

PCT Pub. Date: Feb. 16, 2006

(65) Prior Publication Data

US 2008/0292405 A1    Nov. 27, 2008

(51) Int. Cl.
*F16L 1/19*    (2006.01)
(52) U.S. Cl. .............................. 405/170; 405/166
(58) Field of Classification Search ............... 405/158, 405/166, 167, 168.1, 168.2, 168.3, 168.4, 405/169, 170
See application file for complete search history.

(56) References Cited

U.S. PATENT DOCUMENTS

| 3,472,034 | A | 10/1969 | Lawrence |
| 3,581,506 | A | 6/1971 | Howard |
| 3,860,122 | A | 1/1975 | Cernosek |
| 4,068,490 | A | 1/1978 | Jegousse et al. |
| 6,524,030 | B1 * | 2/2003 | Giovannini et al. ......... 405/170 |
| 6,592,297 | B2 * | 7/2003 | Frijns et al. ................. 405/170 |
| 2002/0159839 | A1 * | 10/2002 | Frijns et al. ................. 405/166 |
| 2003/0219313 | A1 * | 11/2003 | Giovannini et al. ......... 405/166 |
| 2005/0100413 | A1 * | 5/2005 | Baugh ..................... 405/184.5 |
| 2007/0258772 | A1 * | 11/2007 | Bursaux et al. ............. 405/166 |
| 2007/0264084 | A1 * | 11/2007 | Signaroldi et al. .......... 405/158 |
| 2010/0040417 | A1 * | 2/2010 | Bursaux et al. ............. 405/166 |
| 2010/0119307 | A1 * | 5/2010 | Pollack et al. .............. 405/166 |

* cited by examiner

*Primary Examiner*—Frederick L Lagman
(74) *Attorney, Agent, or Firm*—Birch, Stewart, Kolasch & Birch, LLP

(57) ABSTRACT

A marine J-lay pipelaying system for use on a vessel for laying an offshore pipeline has a J-lay tower, a pipe connecting station, wherein said pipe section is connected to the previously launched pipeline, and J-lay tower bearing means which allow for the pivoting of the J-lay tower with respect to the vessel.

The J-lay tower has a free-pivotal mode wherein the J-lay tower is freely pivotable with respect to the vessel so that the J-lay tower has an orientation independent from sea-state induced vessel motions.

A pipe section loader is moveable between a loading position, wherein a new pipe section is received, and a erected position, wherein the new pipe section is aligned with the J-lay tower;

The pipe section loader is provided with an automatic synchronizing system which—when the pipe section loader is moved from its loading position to its erected position—causes a synchronised pivotal motion of the pipe section loader with respect to the J-lay tower in its free-pivotal mode—at the latest as the pipe section loader reaches its erected position—, so that the new pipe section is aligned with the J-lay tower is in its free-pivotal mode.

22 Claims, 10 Drawing Sheets

MARINE J-LAY PIPELAYING SYSTEM

FIELD OF THE INVENTION

The present invention relates to a marine J-lay pipelaying system for use on a vessel for laying an offshore pipeline. In particular the present invention relates to a pipelaying system, wherein a J-lay tower is supported on associated bearing means which allow for the pivoting of the J-lay tower with respect to the vessel.

BACKGROUND TO THE INVENTION

Prior art J-lay pipelaying vessels are known, wherein the J-lay tower is fixed on the vessel. In other known vessels the J-lay tower is supported on bearing means which allow to pivot the J-lay tower, so that the J-lay tower can be brought in a desired orientation and then held in said orientation. In these type of vessels, the J-lay tower, and thus the pipeline, is subjected to sea-state induced vessel motions. As the vessel often are very large, sometimes semi-submersible vessels, the sea-state induced vessel motions are in many cases not a problem.

A far less generally accepted prior art design is disclosed in U.S. Pat. No. 3,581,506 on which the preamble of claim 1 is based. In said prior art vessel the J-lay tower is gimballed so that a freely pivotal motion in any direction is possible. Roll and pitch of the vessel thus do not result in additional stress in the pipeline. In U.S. Pat. No. 3,851,506 a crane controlled by an operator is proposed for loading a new pipe section in the J-lay tower.

OBJECT OF THE INVENTION

The present invention aims to provide an improved marine J-lay pipelaying system for use on a vessel. It is an object of the present invention to allow for low pipeline stresses during laying of the pipeline, even when the vessel is comparatively small and thus subject to relatively large sea-state induced motions. It is a further object of the present invention to provide an efficient pipelaying system. It is a further object of the present invention to provide for an efficient and reliable loading of new pipe sections into the J-lay tower. It is a further object of the present invention to provide for a new pipe section loader to be used for J-lay pipelaying systems.

SUMMARY OF THE INVENTION

The present invention provides a marine J-lay pipelaying system according to the preamble of claim 1, which is characterized in that the pipe section loader is provided with an automatic synchronising system which—when the pipe section loader is moved from its loading position to its erected position—causes a synchronised pivotal motion of the pipe section loader with respect to the J-lay tower in its free-pivotal mode—at the latest as the pipe section loader reaches its erected position—, so that the new pipe section can be erected to the pipe section support and alignment means while the J-lay tower is in its free-pivotal mode.

Through this measure the loading of a new pipe section, which could be made up previously by combining multiple lengths of pipe, into the J-lay tower is possible while the J-lay performs a freely pivotal motion with respect to the vessel. In U.S. Pat. No. 3,581,506 no provision are made for automatic synchronising the pipe section loader with the J-lay tower, so that the crane operator would have to operate his crane in order to obtain synchronised motions. This is hard to do, if at all, and dangerous, as any operator mistake will result in a collision between the loader and the swaying J-lay tower.

As a result of the present invention it will be possible to use a relatively small vessel as a pipelaying vessel, as now the orientation of the J-lay tower can be made independent from sea-state induced vessel motions even at the moment a new pipe section is loaded into the J-lay tower.

It is noted that the present invention e.g. also includes designs wherein the J-lay tower can—as an option—be brought in a fixed orientation mode, e.g. by arresting the J-lay tower in a desired orientation with respect to the vessel. Also it can be envisaged that damping means are provided to dampen the pivotal motions of the J-lay tower in the freely pivotal mode. Also, as an alternative embodiment, the J-lay tower could be arranged to be gimballed with respect to the vessel such that a pivotal motion is allowed in any direction, so that the J-lay tower has two degrees of angular freedom.

Further advantageous embodiments of the inventive system are disclosed in the appended claims and the description which follows.

The system according to the present invention can also be used for other situations such as in an offshore drilling vessel, wherein a drill string handling tower is freely pivotable and drill string members are to be loaded into the drill string handling tower. A similar application can be envisaged, e.g. for risers which are connected to an offshore vessel. These applications are covered by claim 21.

DETAILED DESCRIPTION OF PREFERRED EMBODIMENTS

Figure 1:
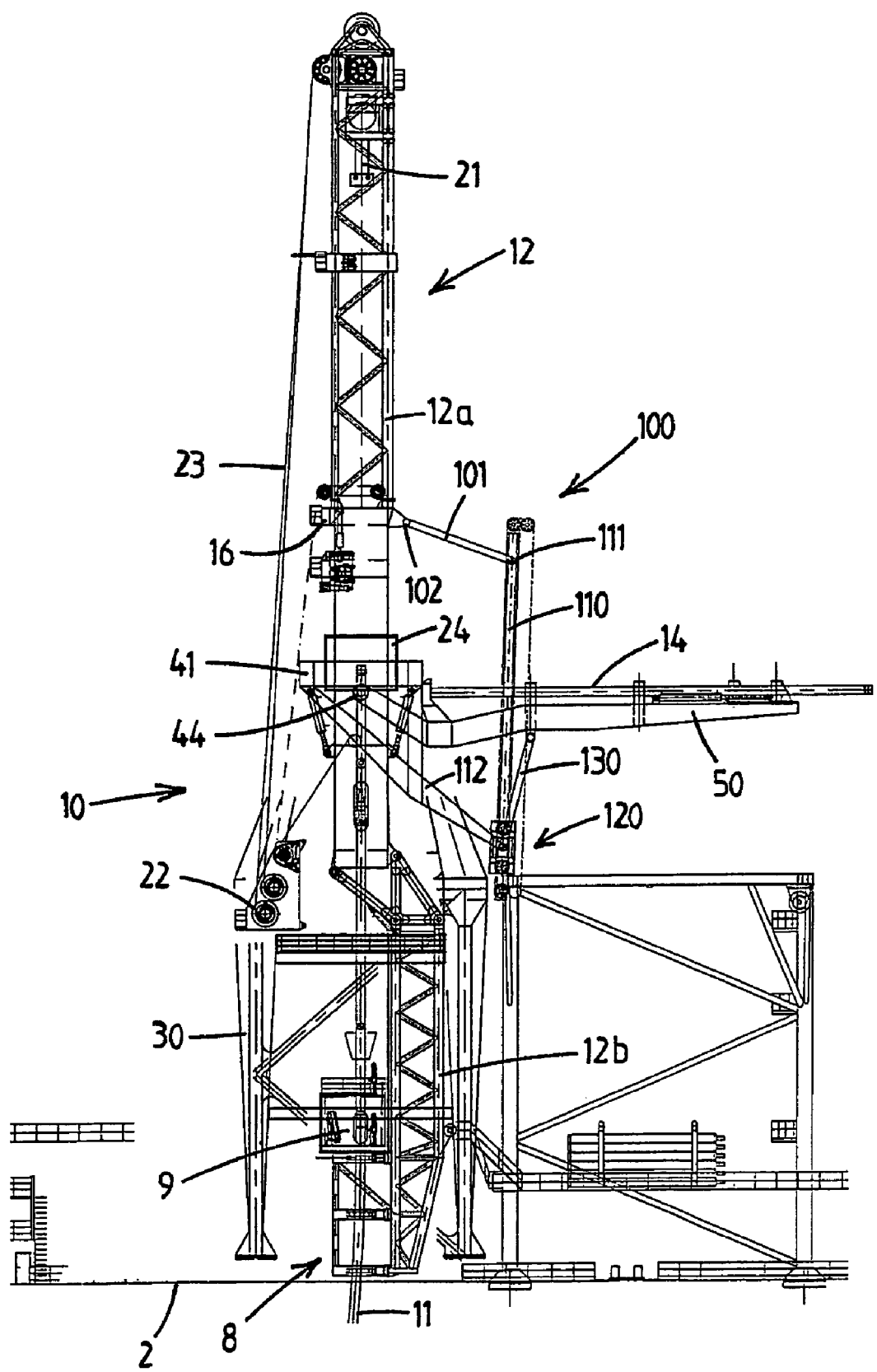
FIG. 1 shows in a side view a part of a vessel provided with a system for J-lay pipelaying according to the present invention, with the pipe section loader in its horizontal loading position, FIG. 2 the vessel of FIG. 1, with the pipe section loader in an intermediate upwardly pivoted position, FIG. 3 the vessel of FIGS. 1 and 2 with the pipe section loader in its erected position aligned with the J-lay tower, FIG. 4 the vessel and pipelaying system of FIGS. 1-3 from a different side, FIG. 5 in side view in detail the pipe section loader of FIGS. 1-4 wherein the loader has been depicted in its loading position as well as in its erected position, FIG. 6 from above the pipe section loader of FIGS. 1-4 with the loader in its loading position, FIG. 7 in another side view the loader of FIGS. 5,6 with the loader in its erected position, FIGS. 8a-e schematically the kinematic principle of the pipe section loader according to FIGS. 1-7.
Figure 2:
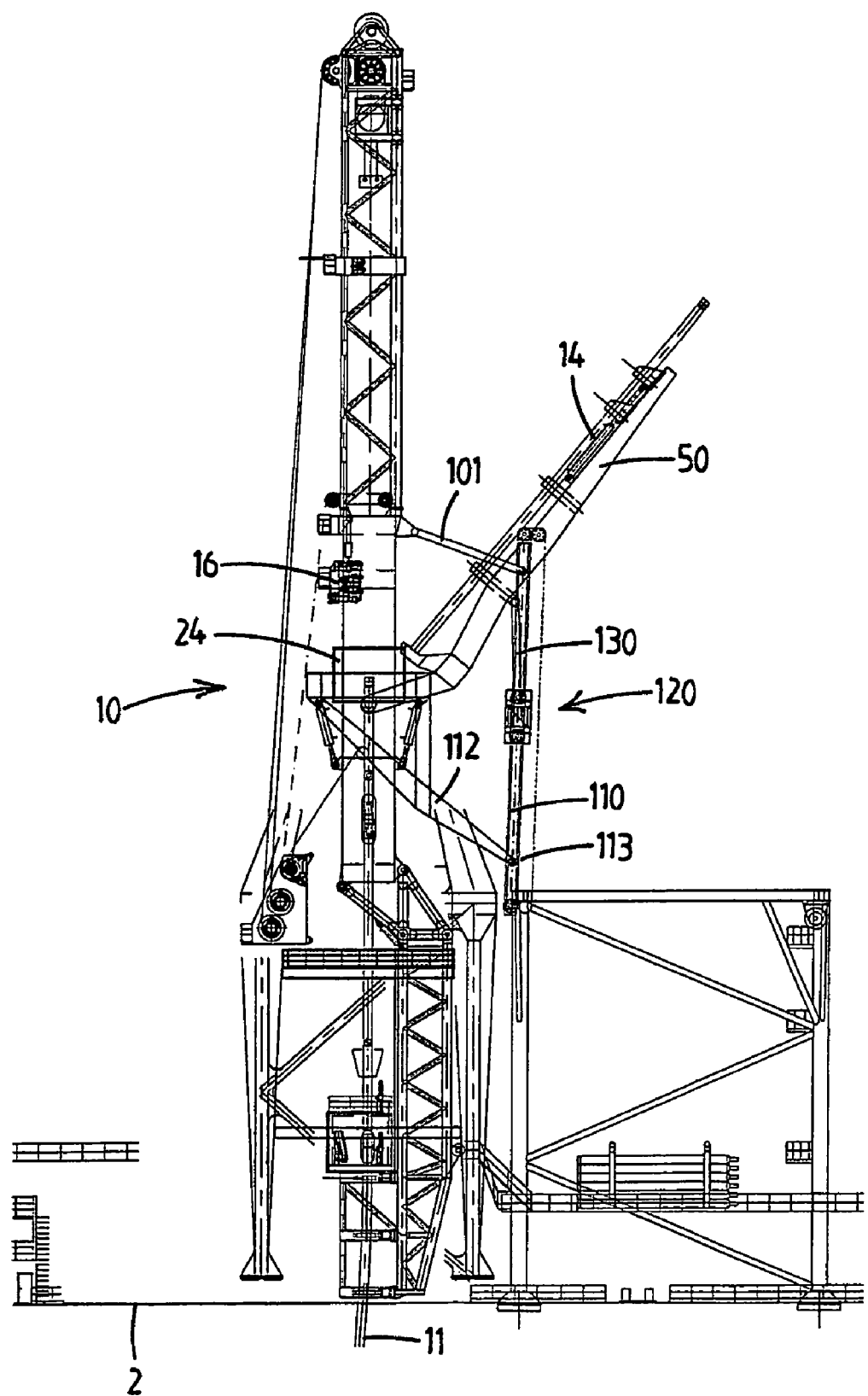
Figure 3:
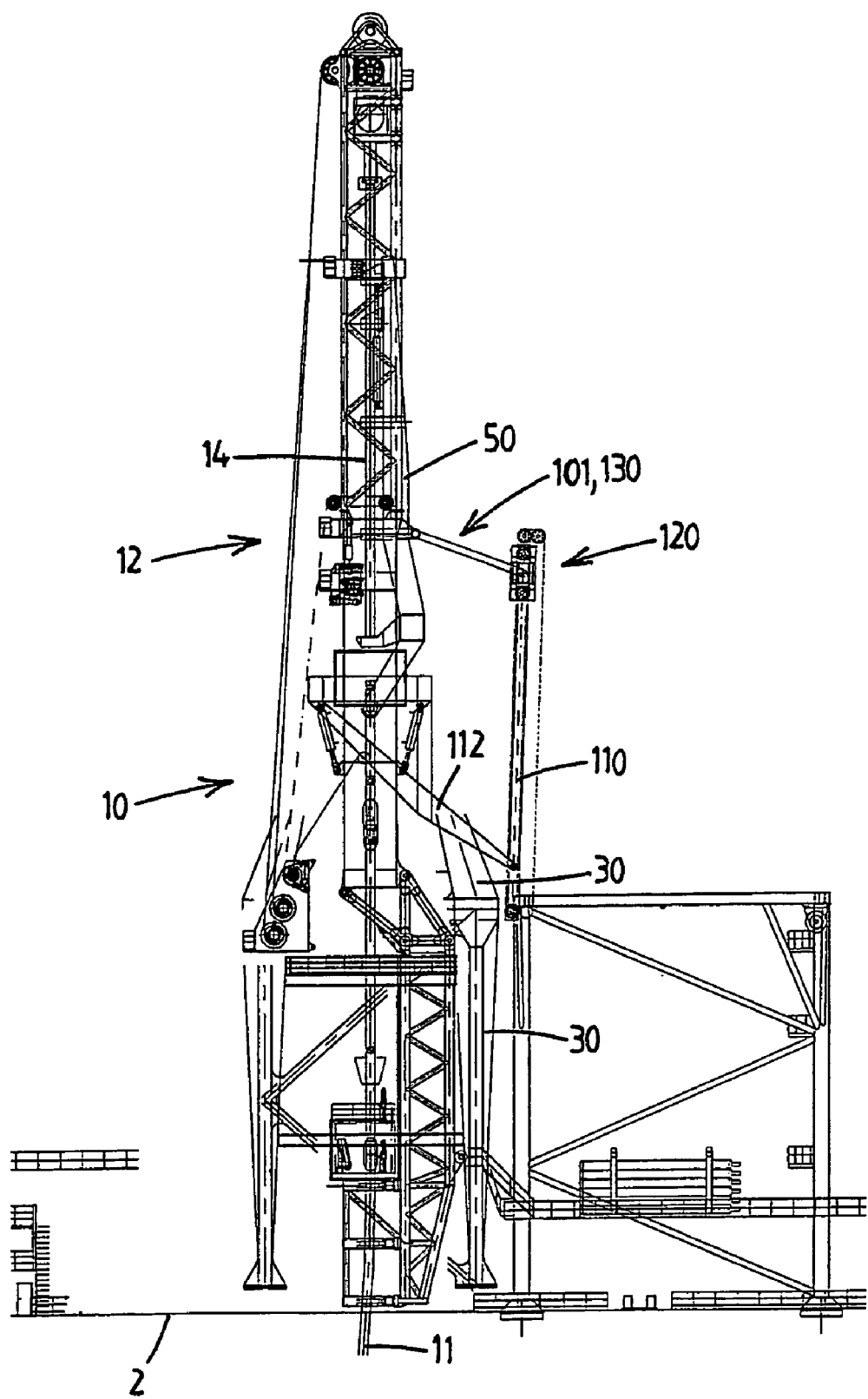
Figure 4:
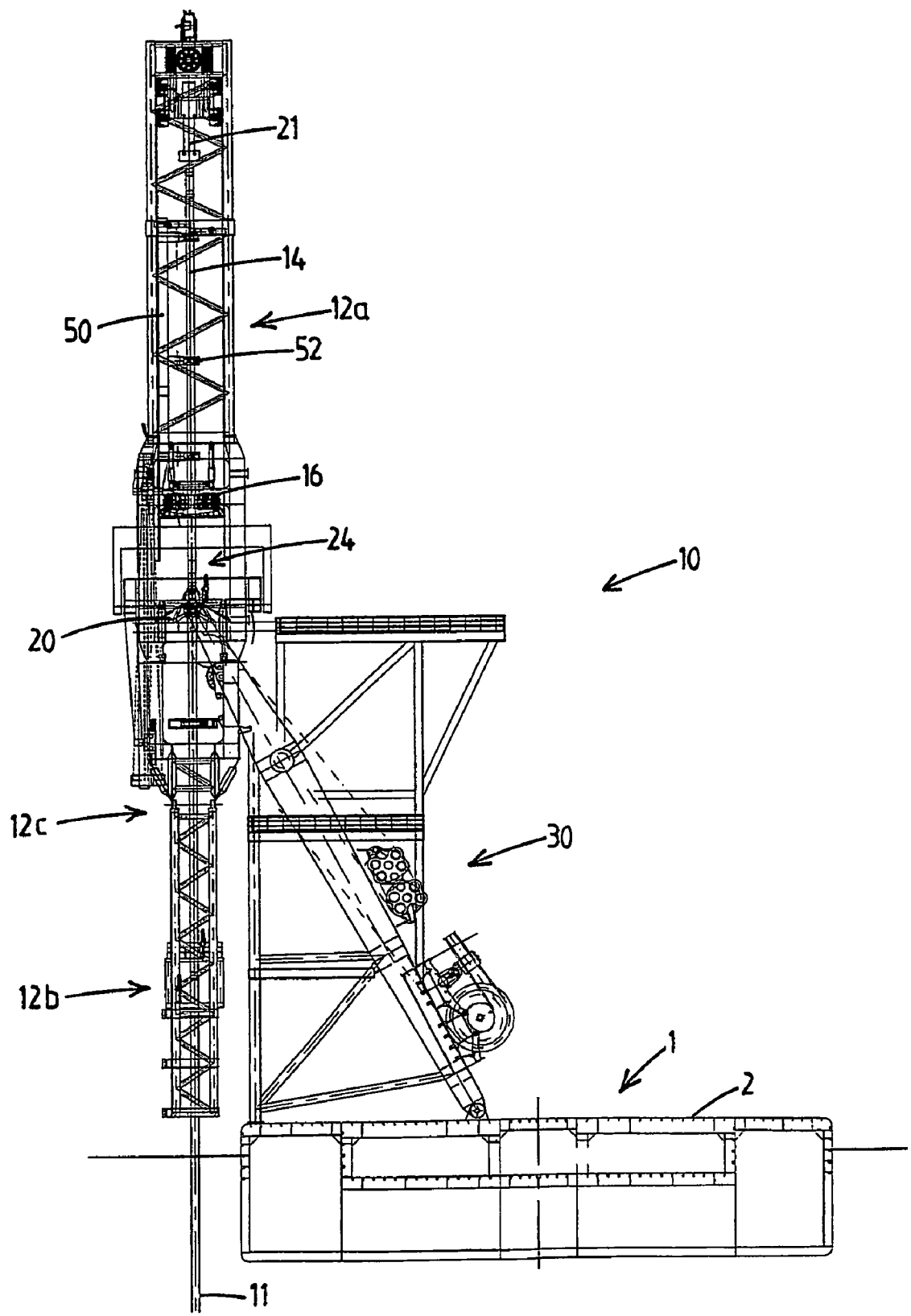

FIGS. 1-4 show an offshore vessel 1 having a deck 2 on which a marine J-lay pipelaying system 10 for laying of an offshore pipeline 11 according to the present invention is mounted. FIGS. 1-3 only show a part of the vessel 1 above the deck 2. In FIG. 4 it can be seen that the pipeline 11 is launched along a side of the vessel 1, but other locations, such as the stern or bow, or through a passage in the hull of the vessel (e.g. moonpool) are also possible. It is noted that the vessel can be of any design, such as a semi-submersible, a pontoon, etc.

The system 10 comprises a J-lay tower 12, which in the embodiment shown in this example has an upper tower structure 12a and a lower tower structure 12b. In this example lower tower structure 12b can be tilted, by means of a tilting assembly 12c at its upper end, with respect to the upper tower structure 12a, between an downwardly directed operative position and an essentially horizontal stowing position, in order not to interfere with mooring etc. of the vessel 1.

The tower structure 12 here is provided with a pipeline support means, here embodied as a static clamp or hang-off clamp 20 (see FIG. 4) for supporting the weight of the previously launched pipeline 11. Other hang-off arrangements, such as suspending the pipeline from cables payed out from winches on the vessel, are also possible.

The tower structure 12a is also provided with a mobile clamp 21 and associated hoisting means (winch 22 and cable 23), which mobile clamp 21 is adapted to be attached to the upper end of the new pipe section 14 when fitted to the pipeline 11, so that the static clamp 20 can then be released and the pipeline 11 lowered using the mobile clamp 21.

The lower structure 12b here includes pipeline guide means 8, e.g. rollers for guiding the launched pipeline 11 and possibly a work station 9, e.g. for applying a coating on the connection between pipe sections.

It is noted that the present invention is not limited to any particular design of the J-lay tower. The tower 12 could e.g. include a stinger extending into the water for guiding the pipeline, an arrangement with a mobile pipeline clamp travelling below the static clamp, etc. Also the tower 12 can have any structural design, e.g. with a lattice structure or as a mast with essentially closed walls.

In order to connect a new pipe section 14 to the uppermost end of the previously launched pipeline 11 a pipe connecting station 24 is provided. The connection station 24 can be of any design, depending on the type of connection. Commonly the station 24 is equipped for welding the new pipe section 14 onto the pipeline 11.

On the deck 2 of the vessel 1 a raised support 30 is arranged, here embodied as a sort of A-frame with two legs and a lattice structure. The J-lay tower 12 is connected to the upper part of said support 30 via J-lay tower bearing means 40.

In this example, see in particular FIGS. 4-7, the bearing means 40 include a gimbal assembly 40 having a gimbal member 41 pivoted about a first pivot axis 42 with respect to the support 30 on the vessel 1. In this example the first pivot 42 is parallel to the longitudinal axis of the vessel 1.

Figure 6:
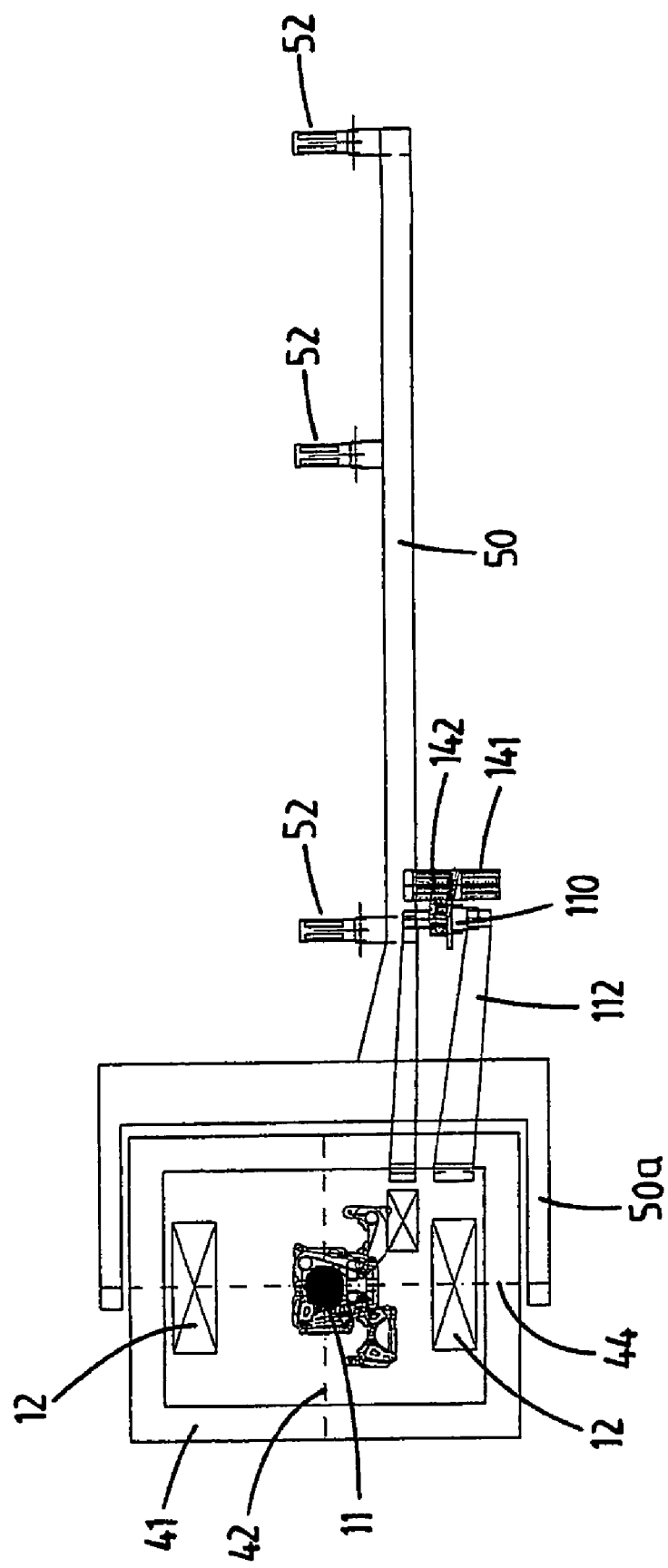

The J-lay tower 12, of which in FIG. 6 only two parallel columns can be recognised, is pivotable about a second pivot axis 44 with respect to the gimbal member 41. As a result the J-lay tower 12 can pivot in any direction with respect to the vessel 1.

The J-lay tower 12 has a free-pivotal mode wherein the J-lay tower is freely pivotable with respect to the vessel 1 so that the J-lay tower 12 has an orientation essentially independent from sea-state induced vessel motions. This has the advantage the tower 12 is aligned with the pipeline 11 so that the stresses on the pipeline 11 are reduced in comparison to known pipelaying systems, wherein the J-lay tower is fixed in a desired position with respect to the vessel, even if the angular position in those prior art vessels can be adapted to the situation (pipeline diameter, water depth, etc).

For the loading of the new pipe sections 14 into the J-lay tower 12—with the J-lay tower 12 in its free-pivotal mode—the drawing shows a preferred embodiment of a pipe section loader 50 as will be explained in detail below referring to the FIGS. 1-8.

As FIG. 1-3 indicate the pipe section loader 50 is pivotable about the second pivot axis 44, so that the loader 50 is moveable between an essentially horizontal loading position (FIG. 1), wherein a new pipe section is received by the pipe section loader 50, and an upwards pivoted erected position (FIG. 3), wherein the new pipe section 14 is essentially aligned with the J-lay tower 12 and can be erected to the pipe section support and alignment means (see FIG. 6).

The pipe section loader 50 here is embodied as an elongated loader structure, having a pivot axis, here coinciding with pivot axis 44, near one end of the elongated loader structure. On the loader structure 50 one or more clamps 52 or other pipe section receiving means are arranged which are adapted to releasable hold the pipe section 14.

The clamps 52 can be designed to act as pipe section support means as the pipe section 14 is connected to the previously launched pipeline 11. Means for accurately aligning the new pipe section 14 with the previously launched pipeline 11 are depicted with reference numeral 16. In another embodiment the pipe section support means are arranged in the tower 12, and the pipe section is clamped by these means and then released by the clamps 52 of the loader 50.

Figure 5:
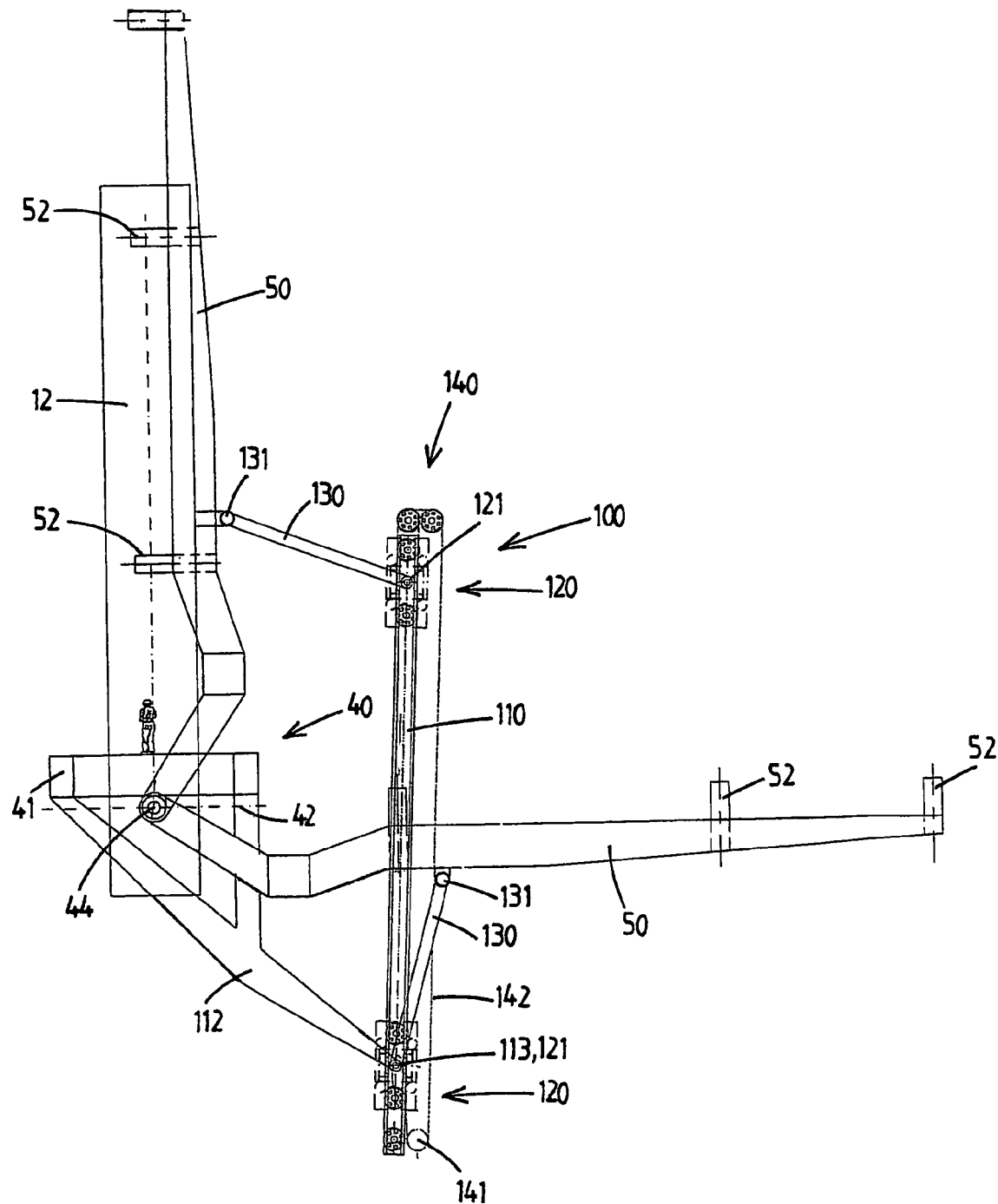
Figure 7:
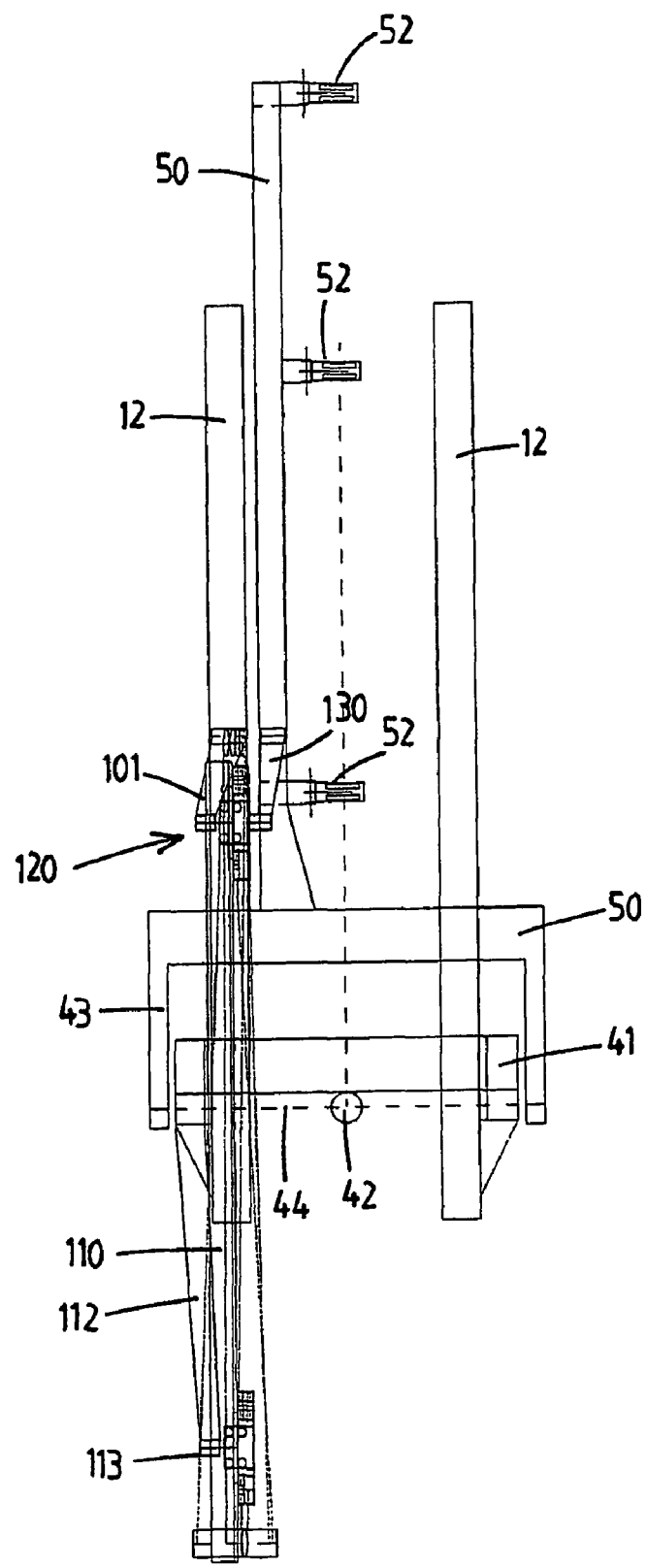

In this embodiment, as can be seen clearly in FIGS. 5-7 the loader 50 has a forked end 50a, that is connected to the gimbal member 41 via the second pivot axis 44 of the gimbal assembly 40. Furthermore, in the example shown here, the pipe section loader 50 is arranged such that a longitudinal axis of a pipe section 14 received by the pipe section loader 50 coincides with the first pivot axis 42 of gimbal assembly 40. As a result, any pivoting movement of the J-lay tower 12 about the first pivot axis 42 does not hinder the placing of a new pipe section 14 into the loader 50. In that case only a slight angular movement of the clamps 52 will be caused by the pivotal tower movement in said direction.

The system 10 is also embodied such that in the vertical plane, i.e. the plane at right angles to second pivot axis 44 of the gimbal assembly, the loader 50 has an essentially stationary loading position with respect to the vessel 1. This allows the safe and efficient placing of a new pipe section 14 in the loader 50.

It will be clear that when the loader 50 comes close to its erected position a collision between the freely pivoting J-lay tower 12 and the loader 50 has to be avoided. In this example the loader 50 follows the pivoting movement of the J-lay tower about first pivot axis 42 at all times. Therefor only the pivoting movement about second pivot axis 44 is relevant for the avoidance of a collision. In fact it is desired that the pipe section loader 50 has the same pivoting movement in all directions as the J-lay tower 12 before the erected position is reached.

According to the present invention the pipe section loader 50 is provided with an automatic synchronising system which—when the pipe section loader 50 is moved from its loading position to its erected position—causes a synchronised pivotal motion of the pipe section loader 50 with respect to the J-lay tower 12 in its free-pivotal mode—at the latest as the pipe section loader 50 reaches its erected position.

It is preferred, as will be explained below, that the synchronisation system is adapted such that in a lower pivot angle range no synchronisation of the pipe section loader with the J-lay tower is caused and the synchronisation is caused in an upper pivot angle range.

In this example an integrated synchronising and pivoting system 100 for the loader 50 is shown, which causes both the pivoting of the loader 50 and the synchronisation thereof with the J-lay tower. This system 100 will be explained in detail.

The system 100 includes a J-lay tower four-bar linkage obtained by the combination of:

the J-lay tower 12, a J-lay tower connecting link 101, pivoted at one end, at pivot axis 102 to the J-lay tower 12 at a location above the second pivot axis 44 provided by the J-lay tower gimbal assembly 40, a further linkage element 110, connected pivotable to the J-lay connecting link 101 about an upper pivot axis 111 and connected to an extension 112 of the gimbal member 41 about a lower pivot axis 113.

As such the gimbal member 41 and its extension form the basis of this "four-bar linkage".

A traveller 120 is associated with the further linkage element 110, so as to be displaceable between a position near the lower pivot axis 113 and a position near the upper pivot axis 111.

A loader connecting link 130 is provided between the traveller 120 and the pipe section loader 50, which loader connecting link 130 is pivotable connected to the traveller 120 via pivot axis 121 and to the loader 50 via pivot axis 131 at a distance from the loader pivot axis 44, such that in a position of the traveller near the upper pivot axis 111 the loader 50, loader connecting link 130, and further linkage element 120 define a "loader four-bar linkage" essentially identical to the "J-lay tower four-bar linkage".

The further linkage 110 is provided with guide means for guiding the traveller 120, e.g. a rectilinear guide, such as a rail, along which the traveller 120 slides or rolls.

Traveller drive means 140 are provided for displacing the traveller 120 along the linkage 110. In this embodiment the traveller drive means 140 include a winch 141, sheaves and a cable attached to the traveller for moving the traveller 120 up and down.

In FIGS. 1-3 it is shown that, when the loader 50 is in its horizontal position and the J-lay tower 12 is in its vertical position, the further linkage 110 is arranged about parallel to the J-lay tower 12. The FIGS. 8*a-e* show that this is not a necessity and that other arrangements are well possible.

It is noted that in these linkage arrangements all pivot axes are parallel. Furthermore, as can be seen in FIGS. 8*a-e*, the distance between pivot axis 44 and pivot axis 102 is equal to the distance between pivot axis 44 and pivot axis 131. Also the length of the linkage 101 is equal to the length of the linkage 130.

Figure 8B:
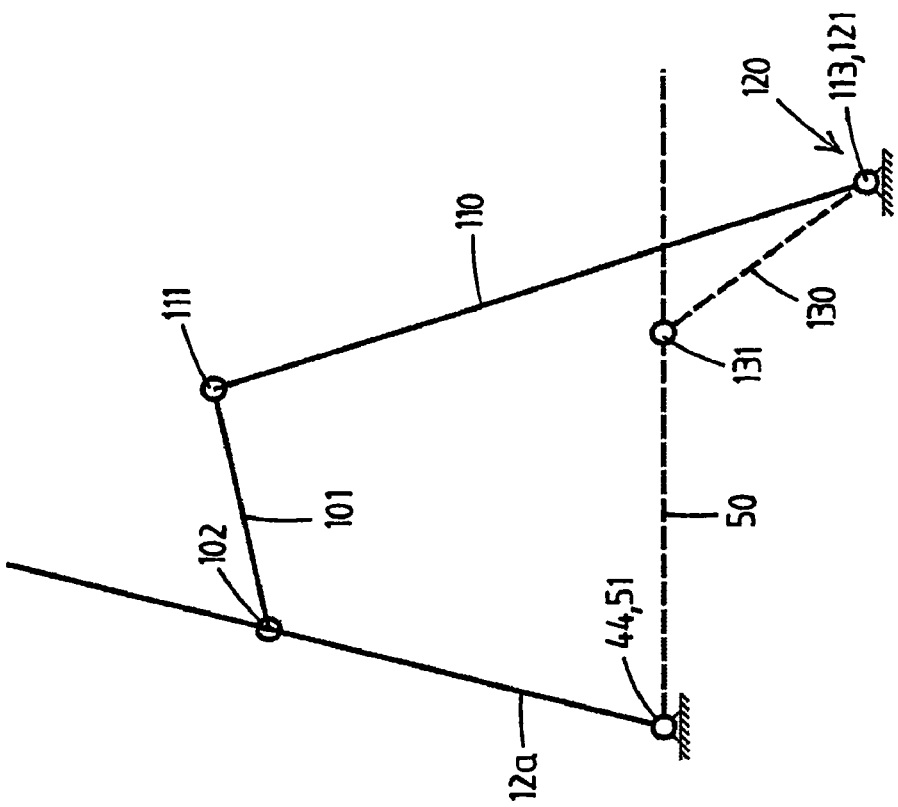
Figure 8A:
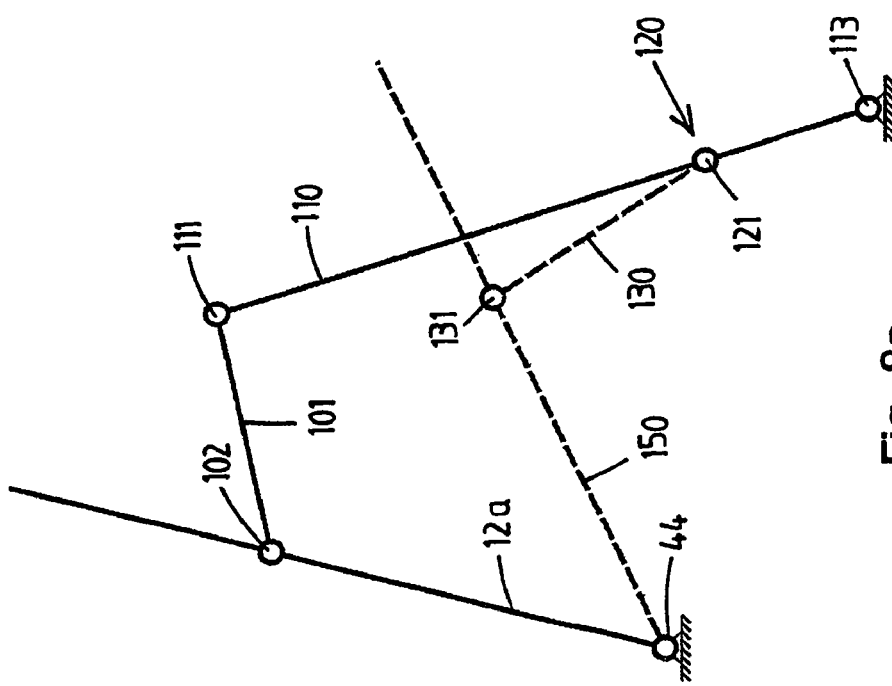

As shown in FIG. 8*a*—in the loading position of the loader—a freely pivotal movement of the J-lay tower 12 about pivot axis 44 will not result in a movement of the loader 50 in said plane. Thus a pipe section 14 can be safely loaded onto the loader 50.

By now displacing upwards the traveller 120—as shown in FIG. 8*b*—the loader 50 is pivoted upwards. In this position a pivoting movement of the tower 12 does not result in a noticeable pivoting movement of the loader 50.

Figure 8C:
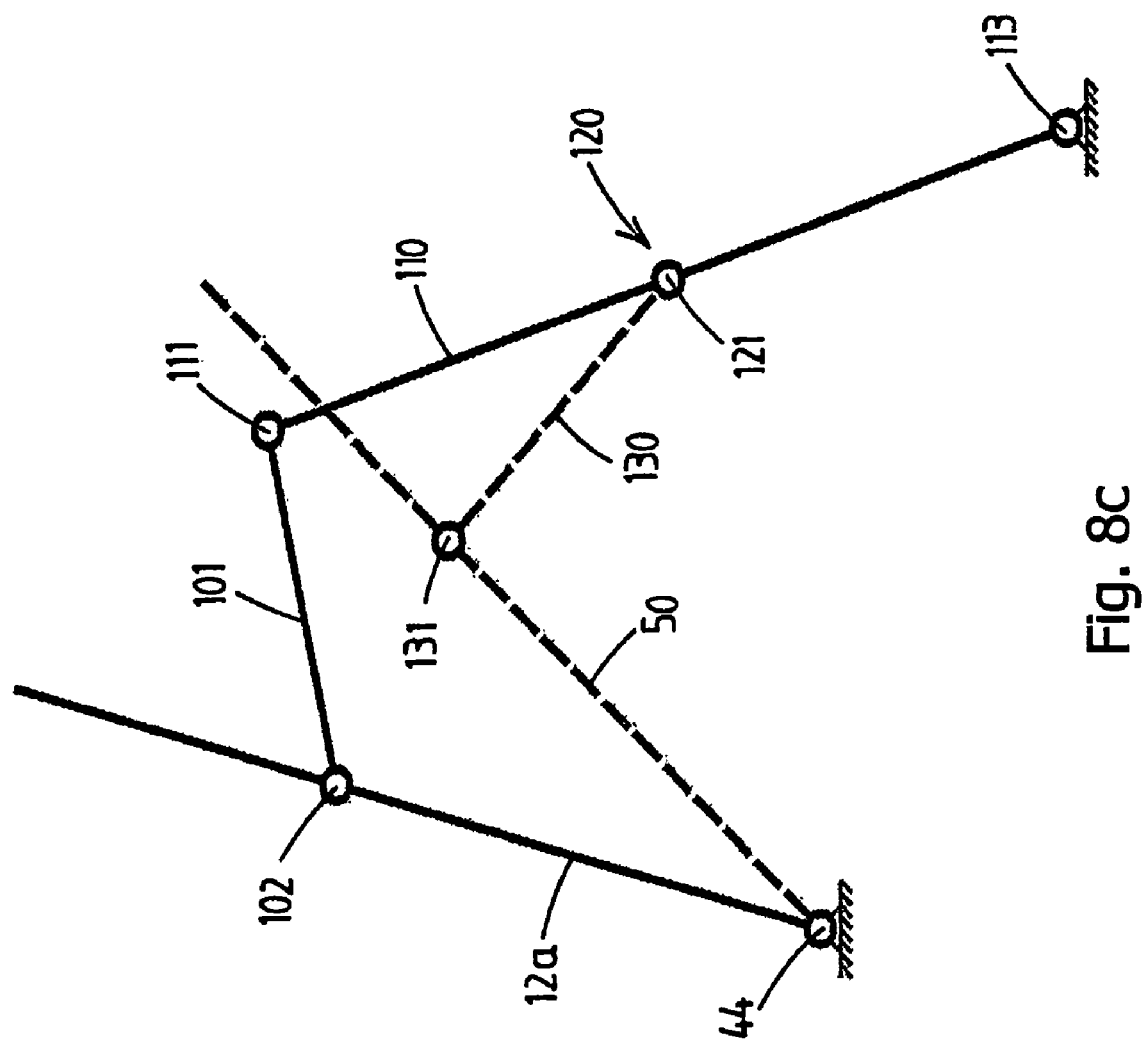
Figure 8D:
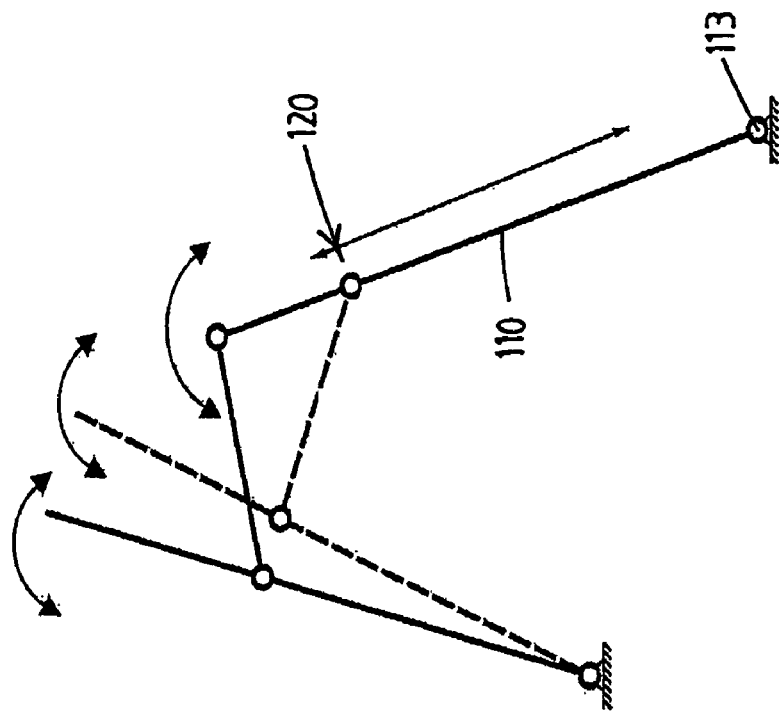

By continuing to move the traveller 120 upwards the loader 50 reaches the position shown in FIG. 8*c* and then FIG. 8*d*. Only in this upper range of the pivoting movement of loader 50, the kinematics cause the loader 50 to gradually copy the freely pivoting movements of the J-lay tower 12. It is noted that by gradually synchronising the loader, excessive stresses in the loader 50 are avoided.

Figure 8E:
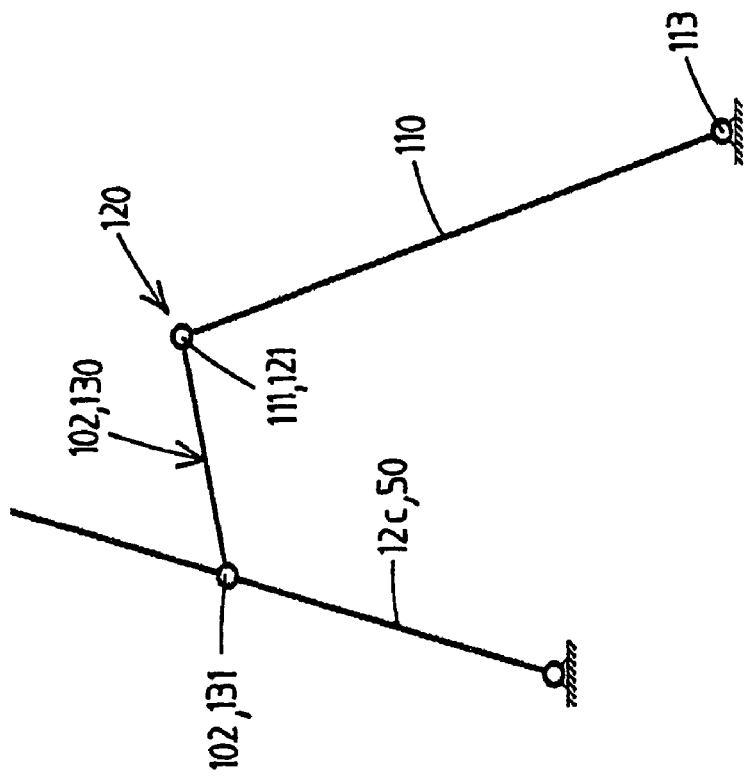

Finally the traveller 120 reaches its upper position, so that now—as can be seen in FIG. 8*e*—the situation is reached that the two four-bar linkages coincide and the loader is in accurate synchronisation with the J-lay tower.

This fail-safe system to pivot and synchronise the loader with respect to the J-lay tower 12 allows for an efficient and reliable loading to new pipe sections into the J-lay tower 12.

It will be clear to the man skilled in the art that the four-bar linkages shown here can be modified. In particular the kinematics can be adapted if desired by suitable selection of the position of the pivot axes.

It is also noted that any suitable means can be provided as traveller and associated drive means. This could also be a traveller associated with a rack-and-pinion for moving the traveller, a hydraulic piston for moving the traveller, etc.

It will be clear that the present invention can also be applied to system, wherein the J-lay tower is only pivotable about a single pivot axis, or a system which provides for two degrees of angular freedom for the pivoting of the J-lay tower, wherein one degree of freedom is cancelled during the loading of a pipe section. As mentioned before this is less preferable in view of efficiency and pipeline stresses.

The loader can also be applied to other situations, e.g. in a floating offshore drilling rig for the handling of drill string sections or the like.

In a completely different design the synchronising system does not rely on a mechanical solution but includes at least one sensor for detecting the pivotal motion of the J-lay tower and a drive means for the loader having a control means connected to the sensor, so that the drive means are adapted to bring the loader into an identical pivotal motion on the basis of the detected pivotal motion. For instance it can be envisaged to have a sensor detecting the pivoting movement of the loader about axis 44 and have a hydraulic actuator for pivoting the loader as well as bringing the loader gradually into a synchronised pivotal movement.

What is claimed is:

1. A marine J-lay pipelaying system for use on a vessel for laying an offshore pipeline, wherein the system comprises:

a J-lay tower;

pipe section support and alignment means, which pipe section support and alignment means are adapted to support a pipe section in alignment with an uppermost end of a previously launched pipeline;

a pipe connecting station, wherein said pipe section is connected to the uppermost end of the previously launched pipeline;

J-lay tower bearing means which allow for the pivoting of the J-lay tower with respect to the vessel about at least one pivot axis;

pipeline support means for supporting the weight of the previously launched pipeline; wherein the J-lay tower has a free-pivotal mode wherein the J-lay tower is freely pivotable about said at least one pivot axis with respect to the vessel so that the J-lay tower has in a plane defined by said at least one pivot axis an orientation essentially independent from sea-state induced vessel motions;

a pipe section loader which is moveable between a loading position, wherein a new pipe section is received by the pipe section loader, and an erected position, wherein the new pipe section is essentially aligned with the J-lay tower;

wherein the marine J-lay pipelaying system further comprises an automatic synchronising system associated with the pipe section loader, which automatic synchronising system causes —when the pipe section loader is moved from the loading position to the erected position —a synchronised pivotal motion of the pipe section loader with respect to the J-lay tower when said J-lay tower is in the free-pivotal mode —at the latest as the pipe section loader reaches the erected position thereof—, so that the new pipe section received by the pipe section loader is aligned with the J-lay tower is in its free-pivotal mode.

2. The system according to claim 1, wherein the pipe section loader is pivotable about an associated pipe section loader pivot axis, so that the pipe section loader is moveable between an essentially horizontal loading position and a upwards pivoted erected position.

3. The system according to claim 2, wherein the synchronisation system is adapted such that in a lower pivot angle range of the pipe section loader essentially no synchronisation of the pipe section loader with the J-lay tower is caused and wherein the synchronisation is effectively caused in an upper pivot angle range of the pipe section loader.

4. The system according to claim 2, wherein the pipe section loader pivot axis coincides with a pivot axis of the J-lay tower bearing means.

5. The system according to claim 1, wherein the pipe section loader is arranged such that a longitudinal axis of a pipe section received by the pipe section loader coincides with a pivot axis of the J-lay tower bearing means.

6. The system according to claim 1, wherein the J-lay tower bearing means comprise a gimbal assembly having a gimbal member pivoted about a first pivot axis with respect to the vessel, and having a second pivot axis, at right angles to the first pivot axis, with respect to the gimbal member.

7. The system according to claim 6, wherein the pipe section loader is pivotable connected to the gimbal member and wherein the pipe section loader is arranged such that a longitudinal axis of a pipe section received by the pipe section loader coincides with said first pivot axis of the gimbal assembly.

8. The system according to claim 7, wherein the pipe section loader is pivotable connected to the gimbal member in an arrangement that allows pivoting of the pipe section loader about the second pivot axis of the gimbal assembly.

9. The system according to claim 2, wherein the pipe section loader comprises an elongated loader structure, and wherein said pipe section loader pivot axis is arranged near one end of the elongated loader structure.

10. The system according to claim 1, wherein the synchronising system includes a mechanical linkage between the J-lay tower and the pipe section loader.

11. The system according to claim 1, wherein the synchronising system includes a four-bar linkage.

12. The system according to claim 2, wherein the synchronising system includes J-lay tower four-bar linkage, said four-bar linkage being obtained by the combination of:
the J-lay tower,
a J-lay tower connecting link, pivoted at one end thereof to the J-lay tower at a location spaced above the at least one pivot axis provided by the J-lay tower bearing means,
a further linkage element, connected pivotable to the J-lay connecting link about an upper pivot point, said further linkage element being connected pivotable about a lower pivot point to an entity to which the pipe section loader is also connected,
and wherein a traveller is associated with the further linkage element, so that the traveller is displaceable between a position near the lower pivot point and a position near the upper pivot point,
and wherein a loader connecting link is provided between the traveller and the pipe section loader, which loader connecting link is pivotable connected to the traveller and also to the loader at a distance from the pipe section loader pivot axis, such that in a position of the traveller near the upper pivot point the loader, loader connecting link, and said further linkage element define a loader four-bar linkage having kinematically relevant dimensions essentially identical to the J-lay tower four-bar linkage.

13. The system according to claim 12, wherein the J-lay tower bearing means comprise a gimbal assembly having a gimbal member pivoted about a first pivot axis with respect to the vessel, and having a second pivot axis, at right angles to the first pivot axis, with respect to the gimbal member, and wherein said further linkage element is connected pivotable about said lower pivot point to the gimbal member, the pipe section loader also being pivotable connected to said gimbal member.

14. The system according to claim 12, wherein the further linkage is provided with guide means for guiding the traveller.

15. The system according to claim 12, wherein traveller drive means are provided for displacing the traveller.

16. The system according to claim 15, wherein the traveller drive means include at least one winch and a cable attached to the traveller.

17. The system according to claim 12, wherein the further linkage is an elongated structure having guide means for the traveller.

18. The system according to claim 12, wherein, when the loader is in its horizontal position and the J-lay tower is in its vertical position, the further linkage is arranged about parallel to the J-lay tower.

19. The system according to claim 1, wherein the synchronising system includes at least one sensor for detecting pivotal motion of the J-lay tower and a drive means having a control means connected to the sensor, so that the drive means are adapted to bring the loader into an identical pivotal motion on the basis of the detected pivotal motion.

20. The system according to claim 19, wherein the drive means is a hydraulic drive means including one or more hydraulic actuators.

21. A J-lay pipelaying vessel provided with a pipelaying system according to claim 1.

22. A system to be used on a vessel, wherein the system comprises:
a tower structure;
tubular section support means arranged on said tower structure, which tubular section support means are adapted to support a tubular section in alignment with an uppermost end of a previously launched tubular section;
a tubular section connecting station, wherein said pipe section is connected to the uppermost end of the previously launched tubular section;
tower bearing means which allow for the pivoting of the tower with respect to the vessel about at least one pivot axis;
tubular section support means for supporting the weight of the previously launched tubular section;
wherein the tower structure has a free-pivotal mode wherein the tower is freely pivotable about at least one pivot axis with respect to the vessel so that the tower structure has in a plane defined by said at least one pivot axis an orientation essentially independent from seastate induced vessel motions;
a tubular section loader which is moveable between a loading position, wherein a new tubular section is received by the tubular section loader, and a erected position, wherein the new tubular section is essentially aligned with the tower structure and can be erected to the tubular section support means;
the system being characterized in that the tubular section loader is provided with an automatic synchronising system which—when the tubular section loader is moved from its loading position to its erected position—causes a synchronised pivotal motion of the tubular section loader with respect to the tower structure in its free-pivotal mode—at the latest as the tubular section reaches its erected position—, so that the new tubular section can be erected to the tubular section support means while the tower is in its free-pivotal mode.

* * * * *